(12) United States Patent
Wetterwald et al.

(10) Patent No.: US 7,443,880 B2
(45) Date of Patent: Oct. 28, 2008

(54) ARRANGEMENT FOR REACHING IPV4 PUBLIC NETWORK NODES BY A NODE IN A IPV4 PRIVATE NETWORK VIA AN IPV6 ACCESS NETWORK

(75) Inventors: Patrick Wetterwald, Mouans Sartoux (FR); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 1065 days.

(21) Appl. No.: 10/875,811

(22) Filed: Jun. 25, 2004

(65) Prior Publication Data
US 2005/0286553 A1 Dec. 29, 2005

(51) Int. Cl.
*H04J 3/22* (2006.01)
(52) U.S. Cl. ...................... 370/466; 370/401
(58) Field of Classification Search ............ None
See application file for complete search history.

(56) References Cited

U.S. PATENT DOCUMENTS

| | | | |
|---|---|---|---|
| 6,118,784 A * | 9/2000 | Tsuchiya et al. ............ 370/401 |
| 6,580,717 B1 | 6/2003 | Higuchi et al. | |
| 6,865,184 B2 | 3/2005 | Thubert et al. | |
| 2004/0103212 A1 | 5/2004 | Takeuchi et al. | |
| 2004/0179508 A1 | 9/2004 | Thubert et al. | |
| 2004/0179532 A1 | 9/2004 | Thubert et al. | |
| 2004/0179536 A1 | 9/2004 | Thubert et al. | |
| 2004/0190549 A1 | 9/2004 | Huitema | |
| 2004/0233916 A1 | 11/2004 | Takeuchi et al. | |
| 2004/0240468 A1 | 12/2004 | Chin et al. | |
| 2005/0089025 A1 | 4/2005 | Boyer et al. | |

OTHER PUBLICATIONS

Nordmark, Stateless IP/ICMP Translation Algorithm (SIIT), RFC 2765, 26 pages, Feb. 2000.*

Hagino et al., An IPv6-to-IPv4 Transport Relay Tanslator, RFC 3142, 11 pages, Jun. 2001.*

Carpenter et al., "Connecting IPv6 Routing Domains Over the IPv4 Internet", *The Internet Protocol Journal*, 3:1, Mar. 2000, pp. 1-10.

Tsirtsis et al., "Network Address Translation—Protocol Translation (NAT-PT)", Network Working Group, Request for Comments: 2766, Feb. 2000, pp. 1-21.

Carpenter et al., "Connection of IPv6 Domains via IPv4 Clouds", Network Working Group, Request for Comments: 3056, Feb. 2001, pp. 1-22.

(Continued)

*Primary Examiner*—Frank Duong
(74) *Attorney, Agent, or Firm*—Leon R. Turkevich

(57) ABSTRACT

An IPv4 node is able to send an IPv4 packet to an IPv4 destination via an IPv6 access network, based on translation of the IPv4 packet into an IPv6 packet for transmission via the IPv6 access network. The IPv4 packet is translated into the IPv6 packet by a local gateway. The IPv6 packet has an IPv6 source address that includes a prescribed address prefix assigned to the local gateway, and an IPv4 address of the IPv4 node. The IPv6 packet also includes an IPv6 destination address that includes a second address prefix assigned to a remote gateway, and a second IPv4 address of the IPv4 destination. The IPv6 packet is converted by the remote gateway into an IPv4 packet for reception by the IPv4 destination via an IPv4 network.

65 Claims, 8 Drawing Sheets

OTHER PUBLICATIONS

Rekhter et al, "Address Allocation for Private Internets", Network Working Group, Request for Comments: 1918, Feb. 1996.

Srisuresh et al., "IP Network Address Translator (NAT) Terminology and Considerations", Network Working Group, Request for Comments: 2663, Aug. 1999.

Tsirtsis et al., "Network Address Translation—Protocol Translation (NAT-PT)", Network Working Group, Request for Comments: 2766, Feb. 2000.

Hain, "Architectural Implications of NAT", Network Working Group, Request for Comments: 2993, Nov. 2000.

Srisuresh et al., "Traditional IP Network Address Translator (Traditional NAT)", Network Working Group, Request for Comments: 3022, Jan. 2001.

Hinden et al., "Internet Protocol Verion 6 (IPv6) Addressing Architecture", Network Working Group, Request for Comments: 3513, Apr. 2003.

Troan et al., "IPv6 Prefix Options for Dynamic Host Configuration Protocol (DHCP) version 6", Network Working Group, Request for Comments: 3633, Dec. 2003.

Carpenter et al., "Connection of IPv6 Domains via IPv4 Clouds", Network Working Group, Request for Comments: 3056, Feb. 2001.

Deering et al., "Internet Protocol, Version 6 (IPv6) Specification", Network Working Group, Request for Comments: 2460, Dec. 1998.

U.S. Appl. No. 10/291,418, filed Nov. 12, 2002, Metzger.

Savola, "A View on IPv6 Transition Architecture", Internet Engineering Task Force, Internet Draft, <draft-savola-v6ops-transarch-03.txt>, Jan. 2004, pp. 1-21.

* cited by examiner

ARRANGEMENT FOR REACHING IPV4 PUBLIC NETWORK NODES BY A NODE IN A IPV4 PRIVATE NETWORK VIA AN IPV6 ACCESS NETWORK

BACKGROUND OF THE INVENTION

1. Field of the Invention

The present invention relates to interoperability between IPv4 networks and IPv6 networks. In particular, the present invention relates to enabling an IPv4 node to access a wide area public IPv4 network (e.g., the Internet), via an IPv6 access network providing network access to the public IPv4 network via a Network Address Translator (NAT) or a Port Address Translator (PAT).

2. Description of the Related Art

Proposals are underway by the Next Generation Transition (NGTRANS) Working Group of the Internet Engineering Task Force (IETF) to enable network nodes to transmit IP packets, generated according to IPv6 protocol as specified by the Request for Comments (RFC) 2460, across an IPv4 network. In particular, RFC 3056 proposes an interim solution (referred to herein as "the 6to4 proposal") of sending IPv6 packets as payload for IPv4 packets, where an interim unique IPv6 address prefix is assigned to any node that has at least one globally unique IPv4 address. These RFCs are available on the World Wide Web at the IETF website ("www.ietf.org").

The 6to4 proposal specifies that an IPv6 node has an IPv6 address that contains an assigned IPv4 address, resulting in an automatic mapping between the IPv6 and IPv4 addresses. Hence, the IPv6 node can easily encapsulate the IPv6 packet with an IPv4 header based on extracting the assigned IPv4 address from within its IPv6 address.

Concerns arise in the event that an IPv6 node is coupled to a private IPv4 network having a Network Address Translator (NAT). NATs perform a Layer-3 translation of IP-Addresses, so that public Internet addresses map to private IP addresses, as described in detail by the Request for Comments 1918 (RFC 1918). This mapping has allowed enterprises to map a large number of private addresses to a limited number of public addresses, thus limiting the number of public addresses required by Internet users.

As described in RFC 3056, however, if an IPv6 node is coupled to an IPv4 network having a NAT, then the NAT box "must also contain a fully functional IPv6 router including the 6to4 mechanism" in order for the 6to4 proposal to still be operable in the IPv4 network having the NAT. However, the modification of existing NATs to include IPv6 routers to include the 6to4 mechanism may not be a practical solution.

Further, the IPv4 addresses of the 6to4 protocol are assumed to be global public addresses. Hence, if an IPv6 node (i.e., a correspondent node) wants to communicate with a roaming mobile IPv6 node, the 6to4 address of the roaming mobile IPv6 node must be a global public address, not a private address.

Another NAT-based proposal for enabling IPv4 hosts in an IPv4 network to access IPv6 hosts in an IPv6 network is described in RFC 2766, entitled "Network Address Translation—Protocol Translation (NAT-PT). The NAT-PT provides a combination of network address translation and protocol translation based on a pool of IPv4 addresses for assignment to IPv6 nodes on a dynamic basis as sessions are initiated across IPv4- IPv6 boundaries. However, the description of the NAT-PT in the RFC 2766 assumes that IPv4 addresses are unique.

A particular issue identified by the inventors involves deployment of IPv6 access networks in areas or countries that to date have not deployed an IPv4 network. In particular, developing countries that to date have lacked any large-scale networking infrastructure are beginning deployment of new Internet Protocol based networks using IPv6 protocol instead of the more traditional IPv4 protocol.

However, problems arise if an end user, having an IPv4 node, attempts to access the IPv4-based Internet via the IPv6 network. Hence, concerns arise that users of an IPv6 access network will not have any connectivity to the existing Internet infrastructure because the existing Internet infrastructure has been implemented according to IPv4 protocol.

To date the only known method of enabling an IPv4 host to access the IPv4-based Internet via an IPv6 network has been to establish an IPv6 tunnel between the IPv4-IPv6 boundaries, namely the first IPv4-IPv6 boundary between the IPv4 host and the IPv6 access network, and the second IPv4-IPv6 boundary between the IPv6 access network and the wide area IPv4 network. However, establishing an IPv6 tunnel between the IPv4-IPv6 boundaries requires IPv6 encapsulation, which in certain applications (e.g., Voice over IP) may almost double the size of the packet, creating bandwidth problems.

SUMMARY OF THE INVENTION

There is a need for an arrangement that enables one or more IPv4 hosts to access a wide area IPv4 network (e.g., the Internet), via an IPv6 access network, without the necessity of establishing an IPv6 tunnel between the IPv4-IPv6 boundaries, namely the first IPv4-IPv6 boundary between the IPv4 host and the IPv6 access network, and the second IPv4-IPv6 boundary between the IPv6 access network and the wide area IPv4 network.

These and other needs are attained by the present invention, where an IPv4 node is able to send an IPv4 packet to an IPv4 destination via an IPv6 access network, based on translation of the IPv4 packet into an IPv6 packet for transmission via the IPv6 access network. The IPv4 packet is translated into the IPv6 packet by a local gateway. The IPv6 packet has an IPv6 source address that includes a prescribed address prefix assigned to the local gateway, and an IPv4 address of the IPv4 node. The IPv6 packet also includes an IPv6 destination address that includes a second address prefix assigned to a remote gateway, and a second IPv4 address of the IPv4 destination. The IPv6 packet is converted by the remote gateway into an IPv4 packet for reception by the IPv4 destination via an IPv4 network.

Hence, the IPv4 node is able to communicate with an IPv4 destination residing on another IPv4 network via the IPv6 access network, without the necessity of generating an IPv6 tunnel between the local gateway and the remote gateway.

One aspect of the present invention provides a method in a gateway coupled to an IPv6 network. The method includes receiving from an IPv4 node an IPv4 packet having a source address field specifying an IPv4 address of the IPv4 node, and a destination address field specifying a globally-unique IPv4 address of an IPv4 node reachable via a remote IPv4 network, and an IPv4 payload. The method also includes translating the IPv4 packet into a new IPv6 packet that includes an IPv6 source address field, an IPv6 destination field, and the IPv4 payload, the IPv6 source address field specifying a first prescribed address prefix assigned to the gateway and the IPv4 address of the IPv4 node, the IPv6 destination address field specifying a second address prefix of a remote gateway and the globally-unique IPv4 address, the remote gateway reachable via an IPv6 network and providing connectivity to a remote IPv4 network. The method also includes outputting the new IPv6 packet to the remote gateway via the IPv6 network.

Another aspect of the present invention provides a method in a gateway coupled to an IPv6 network and an IPv4 network. The method includes receiving from an IPv6 node via the IPv6 network an IPv6 packet having a source address field specifying a first IPv6 address, a destination address field specifying a second IPv6 address, and a payload, the first IPv6 address specifying a first address prefix assigned to the IPv6 node, the first IPv6 address further specifying a first IPv4 address, the second IPv6 address specifying a second address prefix assigned to the gateway and a globally-unique IPv4 address. The method also includes translating the IPv6 packet into a new IPv4 packet that includes an IPv4 source address field, an IPv4 destination address field, and the payload, including inserting within the IPv4 source address field a prescribed IPv4 address assigned to the gateway, and inserting within the IPv4 destination address field the globally-unique IPv4 address based on retrieval thereof from the second IPv6 address. The method also includes storing the first IPv6 address, and the globally-unique IPv4 address, in a Network Address Translation (NAT) table entry, and outputting the new IPv4 packet for delivery via the IPv4 network according to the globally-unique IPv4 address.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
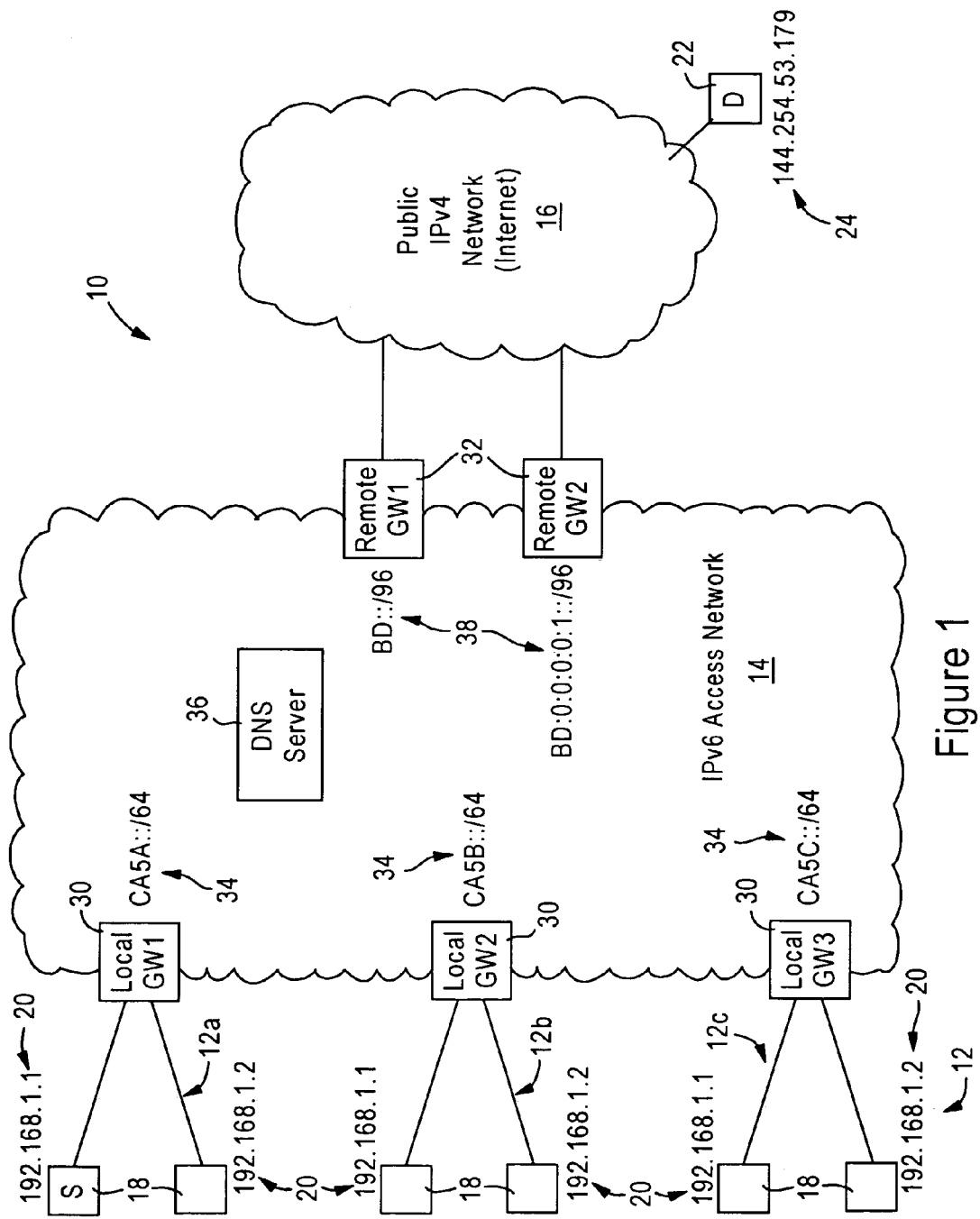
FIG. 1 is a diagram illustrating an internetworking system including private IPv4 networks at respective subscriber premises, an IPv6 access network, and a public IPv4 network such as the Internet, according to an embodiment of the present invention.

FIG. 1 is a diagram illustrating an internetworking system 10 including private IPv4 networks 12 (e.g., 12a, 12b, 12c) at respective subscriber premises, an IPv6 access network 14, and a public IPv4 network 16, according to an embodiment of the present invention. Each private IPv4 network 12 is "private" in that each network node 18 within a corresponding private IPv4 network 12 uses a prescribed private address 20 (e.g., "192.168.1.1") as specified by the RFC 1918, entitled "Address Allocation for Private Internets". In contrast, the public IPv4 network 16 is "public" in that each network node 22 must use a valid, globally-unique IPv4 address 24 (e.g., "144.254.53.179"), as described in the RFC 1918. An example of the public IPv4 network 16 is the Internet.

The disclosed embodiment enables deployment of a private IPv4 network 12 at a customer premises, with access to a wide-area IPv4 network 16 such as the Internet, using an IPv6 network 14 as an access network. The term "customer premises" refers to any location (e.g., home, office, vehicle, etc.) that has a private network and a gateway device (e.g., a fixed or mobile router) for accessing an access network.

In particular, each private network 12 is connected to a corresponding local gateway 30, deployed at the corresponding customer premises and that interfaces between the corresponding private network 12, and the IPv6 access network 14. The local gateway 30 interfaces with the IPv6 access network 14 using an assigned IPv6 address prefix 34 (e.g., a 64-bit address prefix having a hexadecimal value of "CA5A::/64"), and with the corresponding IPv4 network 12 using a prescribed private IPv4 address (e.g., "192.168.0.0"). Hence, the local gateway 30 is "part of" the IPv6 network 14 and its corresponding private IPv4 network in that it has connections to each network. Note that the IPv4 and IPv6 addressing disclosed herein is in accordance with RFC 1918, and RFC 3513, entitled "Internet Protocol Version 6 (IPv6) Addressing Architecture."

Figure 4A:
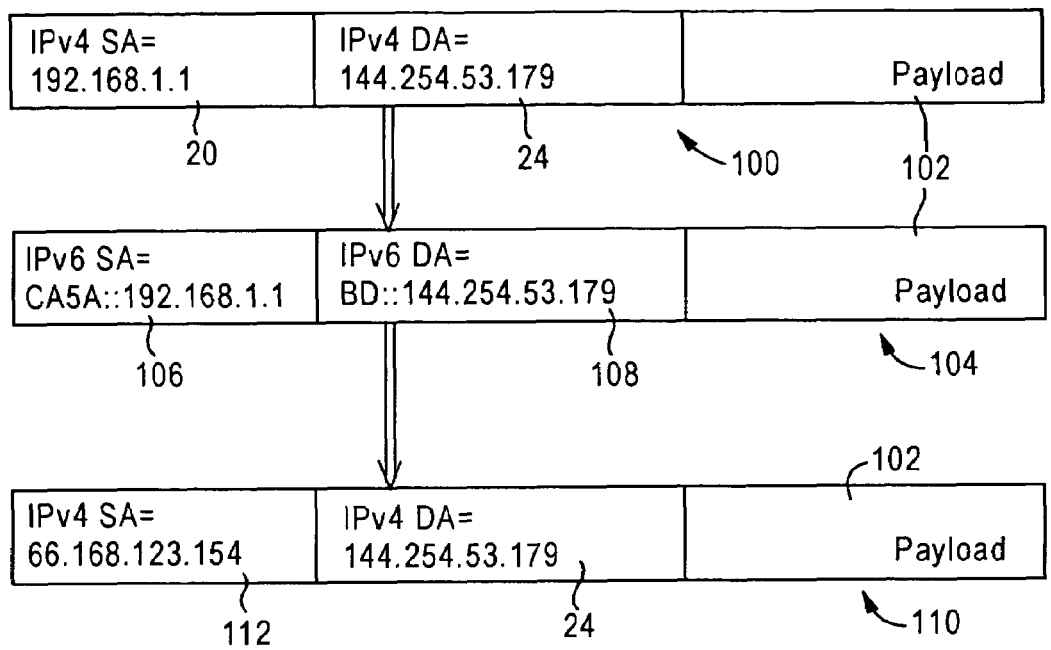
FIGS. 4A and 4B are diagrams illustrating translation of respective request and response packets, by the local gateway and the remote gateway, according to an embodiment of the present invention.

The local gateway 30 is configured for translating an IPv4 packet 100, illustrated in FIG. 4A and having a private IPv4 source address 20, a public IPv4 destination address 24, and an IPv4 payload (including TCP/UDP header information), to an IPv6 packet 104 having an IPv6 source address 106 and an IPv6 destination address 108. The private IPv4 address 20 is assigned to a local IPv4 node 20 in the private IPv4 network 12 either manually or by the local gateway 30 according to DHCP protocol.

The assigned IPv6 address prefix 34 for the corresponding local gateway 30 may be assigned to the local gateway 30 either statically (e.g., based on programming of a nonvolatile register), or preferably dynamically, for example by an access router in the IPv6 access network 14 (not shown) using Dynamic Host Configuration Protocol (DHCPv6) according to RFC 3633.

As described below, the local gateway 30 is configured for translating the IPv4 packet 100, received from the IPv4 node 18 in the private IPv4 network 12, into an IPv6 packet 104 for transfer via the IPv6 access network 14 to an identified remote gateway 32 (e.g., "GW1"). An example of a gateway configured for assigning a private IPv4 network address 20, and which can be configured to perform the gateway operations disclosed herein, is a comercially-available Linksys® router from Cisco Systems, Inc., available at the website address "www.linksys.com".

The IPv6 access network 14 includes at least one remote gateway 32 that interfaces between the IPv6 network 14 and the public IPv4 network 16. As illustrated in FIG. 1, the IPv6 access network also includes a directory service (e.g., a domain name server) 36 that enables each local gateway 30 to locate a remote gateway 32 for accessing the public IPv4 network 16, for example based on sending a query using the domain name service "gw1.query.IPv4gateway.ipv6accessnetwork.com", where "accessnetwork.com" identifes the access network 14, "query.IPv4 gateway" identifies the service as a query for an IPv4 gateway, and "gw1" identifies the requesting source.

Each remote gateway 32 has a corresponding assigned IPv6 address prefix 38 used for translation between IPv6 and IPv4 addresses, described below. Note that multiple remote gateways 32 may be deployed for large-scale deployment, where each remote gateway has a corresponding assigned public IPv4 address 112 (illustrated in FIG. 2), and a prescribed IPv6 address prefix (e.g., BD::/96, BD:0:0:0:0:1::/96, BD:0:0:0:0:2::/96, etc.) 38 within an aggregate remote gateway prefix (e.g., "BD::/80"). Also note that multiple remote gateways are necessary for wide scale deployment, since each remote gateway 32 needs to maintain state information relating to NAT translation of the IPv6 packet into an IPv4 packet for transmission onto the public IPv4 network 16, and conversely for IPv4-to-IPv6 translation for a received IPv4 packet from the public IPv4 network 16 into an IPv6 packet for transmission to a destination gateway 30 via the IPv6 network.

The remote gateway 32 is configured for translating the received IPv6 packet 104 into a new IPv4 packet 110, illustrated in FIG. 4A and that includes a public IPv4 source address 112 and a public IPv4 destination address 24, enabling the transfer of the new IPv4 packet 110 (with the original payload 102 output by the local IPv4 node ("S") 18) to the intended destination node 22 via the public IPv4 network 16.

As described below, the remote gateway 32 is configured for storing translation state information in an internal NAT table, enabling the remote gateway 32 to translate an IPv4 response packet 120, having been received from the public node 22 in the public IPv4 network 16, into an IPv6 packet 122 having a destination address 106 destined for the local gateway 30. The local gateway 30 is configured for translating the IPv6 packet 122 into an IPv4 packet 124 for delivery to the originating private IPv4 node 18.

Figure 2:
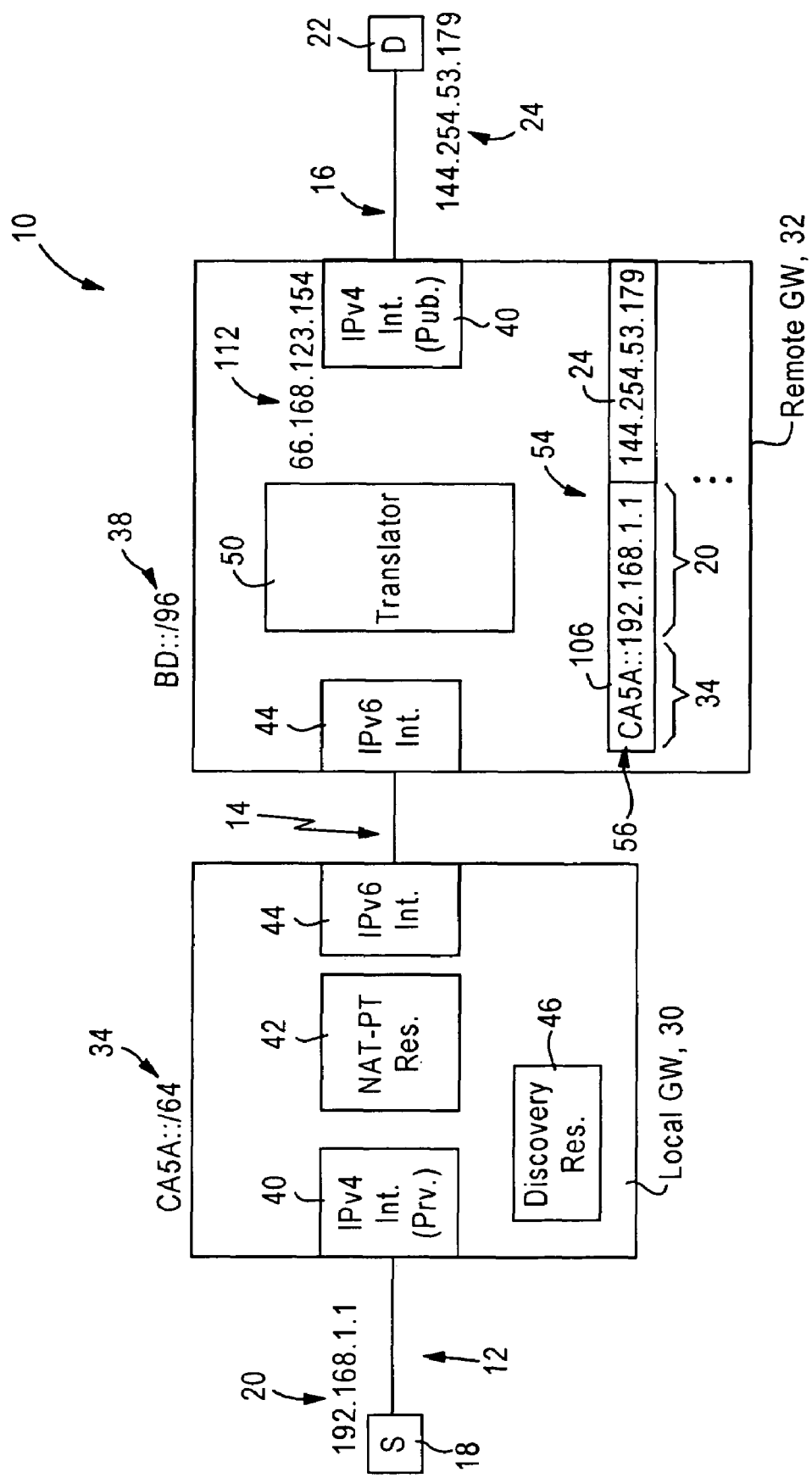
FIG. 2 is a diagram illustrating in further detail one of the local gateways and the remote gateway of FIG. 1, used to provide access to the public IPv4 network by a node in the private IPv4 network, according to an embodiment of the present invention.

FIG. 2 is a diagram illustrating in further detail one of the local gateways 30 and remote gateways 32 of FIG. 1, used to provide access to the public IPv4 network by a node 18 in the private IPv4 network 12, according to an embodiment of the present invention.

The local gateway 30 includes an IPv4 interface 40 configured for sending and receiving IPv4 packets using private addresses, a NAT-PT based translation resource 42 configured for translating between IPv4 packets and IPv6 packets, an IPv6 interface 44 for sending and receiving IPv6 packets onto and from the IPv6 access network, and a discovery resource 46. The remote gateway 32 includes an IPv6 interface 44, a translator resource 50, an IPv4 interface 40 configured for sending and receiving IPv4 packets onto the public IPv4 network 16 using public addresses, and a NAT table 54. As described below with respect to FIG. 5, the translator resource 50 includes a NAT-PT resource 51 for IPv6-to-IPv4 translations and vice versa, a NAT/PAT resource 53 for performing IPv4 address translations between private and public IPv4 addresses (and PAT-based port translations for address reuse), and an application level gateway resource 52.

Each of the IPv4 interfaces 40 are configured for sending and receiving IPv4 packets. In particular, the IPv4 interfaces 40 of the local gateway 30 is configured for sending and receiving IPv4 packets within the prescribed private IPv4 address space, and the IPv4 interface 40 of the remote gateway 32 is configured for sending and receiving IPv4 packets within the prescribed public IPv4 address space.

The local gateway 30 also includes a discovery resource configured for identifying the remote gateway 32 based on sending a query to the DNS server 36, and receiving a query response that includes the address prefix for the remote gateway 32 (e.g., "BD::/96") enabling the translation resource 42 to utilize the prescribed address prefix 38 ("BD::/96") for generating the IPv6 address 108.

Each translation resource 42 and 50, also referred to as a translator or translator resource, is configured for translating between the IPv4 packets and an IPv6 packet as illustrated herein with respect to FIGS. 3A, 3B, 3C, and 3D, and FIGS. 4A and 4B.

Figure 4B:
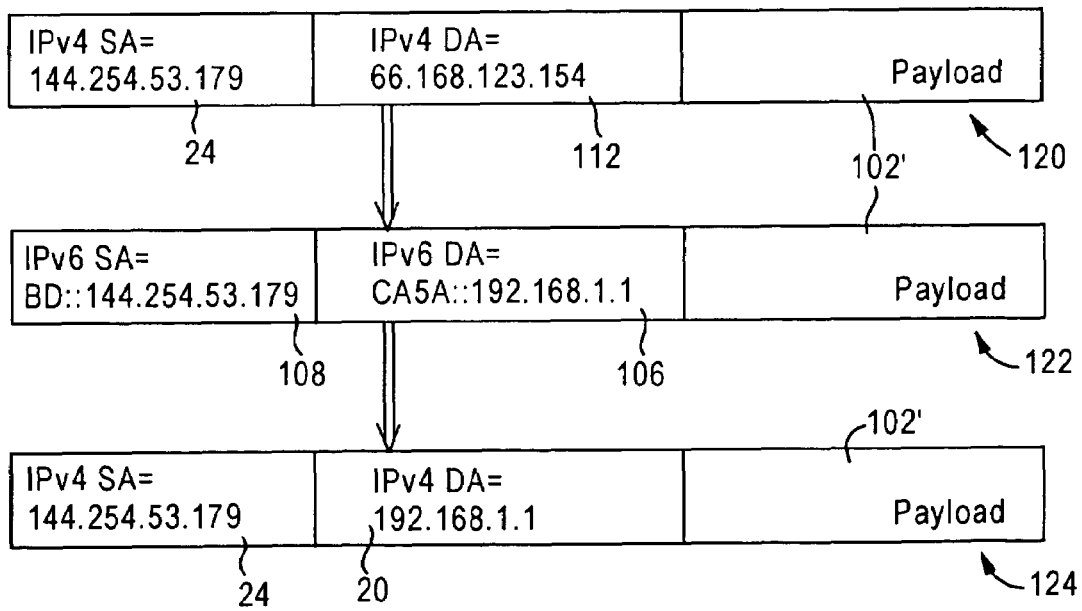
Figure 5:
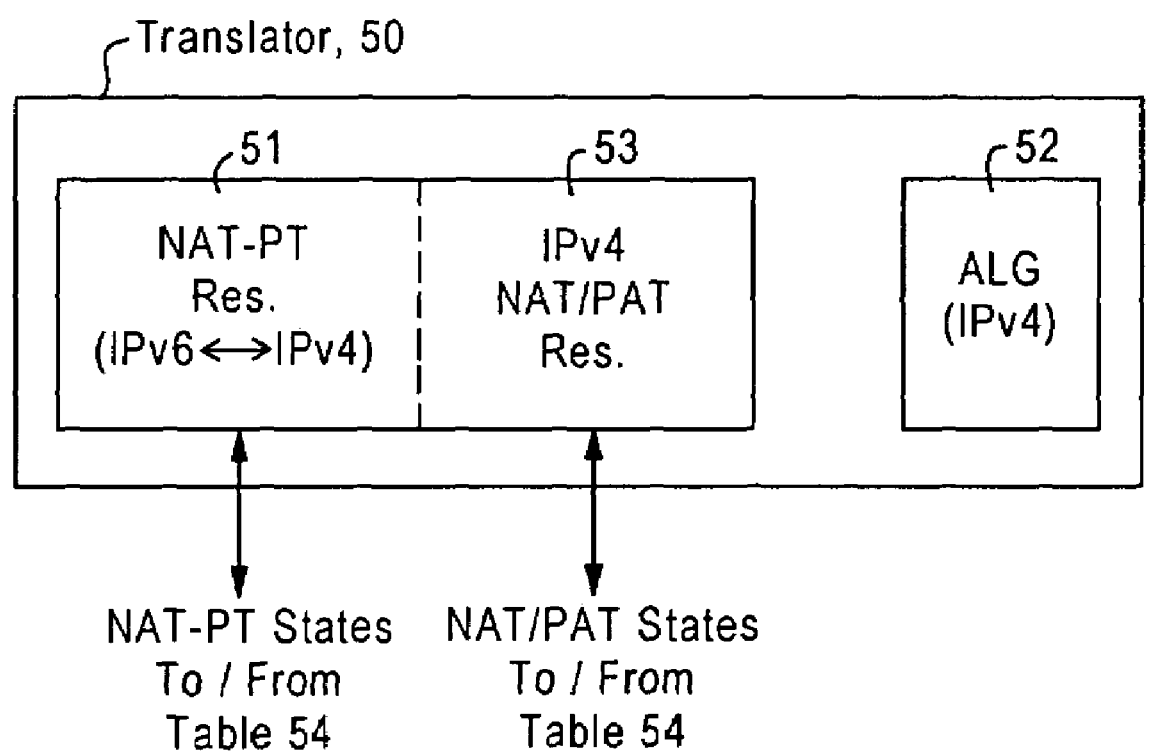
FIG. 5 is a diagram illustrating in detail the translator of the remote gateway of FIG. 2, according to an embodiment of the present invention.

As illustrated in FIG. 5, the translation resource 50 of the remote gateway 32 includes NAT-PT translation resource 51 configured for for IPv6 to IPv4 translation and vice versa, a NAT (and PAT) translation resource 53 configured for translating between private IPv4 addresses and public IPv4 addresses, and an application level gateway (ALG) resource 52 in accordance with RFC 2766. The NAT-PT translation resource 51, similar to the NAT-PT based translation resource 42, is configured for IPv6 to IPv4 translation as illustrated in FIGS. 3A, 3B, 3C, and 3D, and FIGS. 4A and 4B. The translation resource 51 stores IPv6-to-IPv4 translation states in the NAT table 54 in the form of entries 56.

The IPv4NAT/PAT translation resource 53 is configured for translating between private and public IPv4 addresses as known in the art, for example as described in RFC 1918. In addition, the translation resource 53 includes PAT functionality that enables the remote gateway 32 to reuse an assigned public address 112 for multiple connections on the IPv4 network 16. In particular, if the source IPv4 node ("S") 18 outputs a packet 100 having an originally-specified TCP/UDP port value (e.g., "80") specified in the payload (e.g., in the TCP/UDP source port field), the PAT functionality in the IPv4 NAT/PAT translation resource 53 will translate the originally-specified TCP/UDP port value in the TCP/UDP source port field to a translated TCP/UDP port value (e.g., "1") to serve as a 16-bit reference for identifying the data flow, and add an NAT/PAT table entry (e.g., within the table 54) that specifies not only the translated IPv4 private and public addresses (e.g., "192.168.1.1" and "66.168.123.154"), but also the originally-specified and translated TCP/UDP port values (e.g., "80" and "1"). Hence, the PAT functionality enables the remote gateway to use the same IPv4 public address for $2^{16}$ distinct connections.

The translation resource 53 also includes reverse PAT functionality, enabling the translation resource 53 to determine that a reply packet 120 is destined for the original source node ("S") based on the matching the stored table entry pair of the destination address 112 and the destination TCP/UDP port (e.g., "1") in the payload 102': in this case, the reverse PAT functionality translates the destination TCP/UDP port field from the translated TCP/UDP port value (e.g., "1") to the originally-specified TCP/UDP port value (e.g., "80"). A reverse NAT functionality in the translation resource 53 also enables a packet from the IPv4 network 16 to reach the appropriate private node 18 based on proactive information (e.g., manual or remote configuration) enabling the translation resource 53 to associate the packet with the private node 18.

Also note that the NAT-PT states (i.e., translation between IPv6 and IPv4) generated by the NAT-PT translator 51 and stored as respective table entries 56 will be associated with the NAT states (i.e., translation between private and public IPv4 addresses) to enable the reverse NAT functionality to uniquely identify a data flow. In particular, numerous private nodes 18 in respective private networks 12a, 12b, and 12c may use the same private IPv4 address 20 (e.g., "192.168.1.1"); hence, the translation resource 53 needs to be able to associate the NAT state (stored in the table 54) with the corresponding NAT-PT state, which is uniquely identifiable by the corresponding table entry 56 specifying the 96-bit IPv6 prefix (e.g., "CA5A::/96") 34 and the private address (e.g., "192.168.1.1"). For example, the NAT-PT state and the NAT state based on appending the NAT state to the NAT-PT state information in the same table entry 54; alternately, the NAT-based translation resource 53 could be implemented to issue a function call to the NAT-PT based translation resource 51. As apparent from the foregoing, PAT state information would be associated in the same manner.

The ALG resource 52 is associated with the IPv4 NAT/PAT functionality executed by the translation resource 53, and as such is part of the part of the IPv4 based translation operations (alternately, the ALG 52 could be implemented as part of the translation resource 53). Since certain applications carry network addresses in the payloads, if the ALG resource 52 detects a network address within the payload 102 or 102', the ALG resource 52 converts the network address within the payload as needed (e.g., from "192.168.1.1" of packet 104 to "66.168.123.154" for packet 110; from "66.88.123.154" of packet 120 to "192.168.1.1" for packet 122), based on the associated NAT state, to enable execution of the application at the private node 18.

The remote gateway 32 also includes a network address translation (NAT) table 54 including a table entry 56 for each connection between a source node 18 in a private IPv4 network 12 and a destination node 22 in the public IPv4 network 16. At a minimum, each table entry 56 includes the destination address 24 of the destination node 22, and the IPv6 address 106 used as a source address by the local gateway 30: as illustrated in FIG. 2 and FIGS. 4A and 4B, the source address 106 used by the local gateway 30 includes the assigned IPv6 prefix 34 for the corresponding local gateway 30, and the private IPv4 address 20 of the source node 18. Depending on implementation, however, other address fields may be added to the corresponding table entry. For example, if the translation resource 53 is implemented as a symmetric NAT having NAT-PT functionality, each address entry could include the source IPv6 address 106, source UDP port, destination IPv6 address 108, destination UDP port of the received IPv6 packet 104, as well as the source IPv4 address 112, source UDP port, destination IPv4 address 24, and destination UDP port of the transmitted IPv4 packet 110, or any combination thereof. Also note that storage of the source IPv4 address 112 in the table entry may be necessary if the remote gateway 32 uses a pool of public IPv4 addresses 112 (e.g., within the range of the IPv4 address prefix "66.168.123/24"), as opposed to a single IPv4 address (e.g., "66.168.123.154").

FIGS. 3A, 3B, 3C, and 3D are flow diagrams summarizing the method of transmitting IPv4 packets between the IPv4 private network and IPv4 public network via the IPv6 network using the local gateway and the remote gateway, according to an embodiment of the present invention. The steps described below with respect to FIGS. 3A, 3B, 3C, and 3D can be implemented in the gateways as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

Figure 3A:
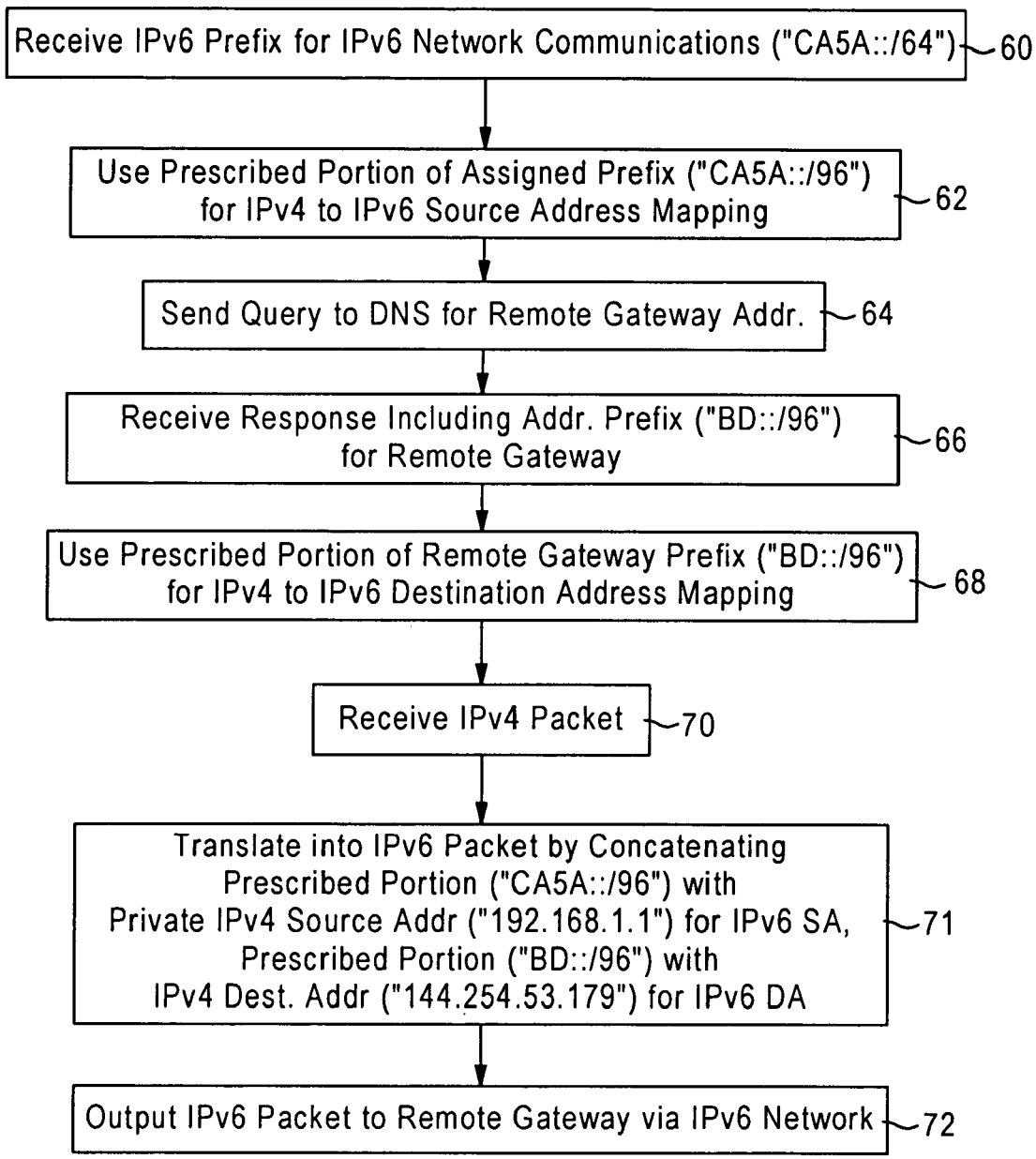
FIGS. 3A, 3B, 3C, and 3D are flow diagrams summarizing the method of transmitting IPv4 packets between the IPv4 private network and IPv4 public network via the IPv6 network using the local gateway and the remote gateway, according to an embodiment of the present invention.

Referring to FIG. 3A, the discovery resource 46 in the local gateway 30 is initially configured by receiving in step 60 an assigned IPv6 prefix 34 to be used for communications in the IPv6 access network 14, for example according to DHCPv6 protocol. The translation resource 42 in step 62 selects a prescribed portion of the assigned prefix (e.g., "CA5A::/96") for IPv4 to IPv6 source address mapping. If the discovery resource 46 does not detect an identified remote gateway 32, the discovery resource 46 sends in step 64 a query to the DNS 36 for a remote gateway address prefix for a corresponding remote gateway 32.

In response to receiving in step 66 a query response that includes the address prefix (e.g., "BD::/96") for a remote gateway 32, the translator 42 uses in step 68 a prescribed portion of the remote gateway prefix 38 ("BD::/96") for IPv4 to IPv6 destination address mapping. As apparent from the foregoing, use of a 96-bit prefix 38 enables the translation resource 42 to generate a valid IPv6 address merely by concatenating the address prefix 38 with a received 32-bit IPv4 address 20.

Assume the local IPv4 node 18 ("S") outputs an IPv4 packet 100, illustrated in FIG. 4A, having a source address field specifying the private IPv4 address ("192.168.1.1") 20, an IPv4 source port field in the payload 102 specifying a private port (e.g., TCP port or UDP port), a destination address field specifying a public IPv4 address ("144.254.53.179") 24, and a destination port field in the payload 102 specifying a public port (e.g., TCP/UDP port).

In response to the private IPv4 interface 40 receiving in step 70 the packet from the local IPv4 node 18 via the private network 12, the translator resource 42 of the local gateway 30 converts in step 71 the IPv4 packet 100 into an IPv6 packet 104 for transmission via the IPv6 access network 14. Specifically, the translator resource 42 creates a new IPv6 header specifying new IPv6 source address 106 and a new IPv6 destination address 108. The new IPv6 source address ("CA5A::192.168.1.1") 106 is generated based on the translator 42 concatenating the prescribed address prefix ("CA5A::/96") with the private IPv4 source address ("192.168.1.1") 20; the new IPv6 destination address ("BD::144.254.53.179") is generated based on the translator 42 concatenating the prescribed address prefix of the remote gateway prefix ("BD::/96") 38 with the public IPv4 destination address ("144.254.53.179") 24. If desired, the translator 42 also may add IPv6 option headers related to the layer 4 TCP/UDP source and destination ports, as described in detail in RFC 2460.

The IPv6 interface 44 of the local gateway 30 outputs in step 72 the newly-created IPv6 packet 104 for delivery to the remote gateway 32 via the IPv6 access network 14.

Figure 3B:
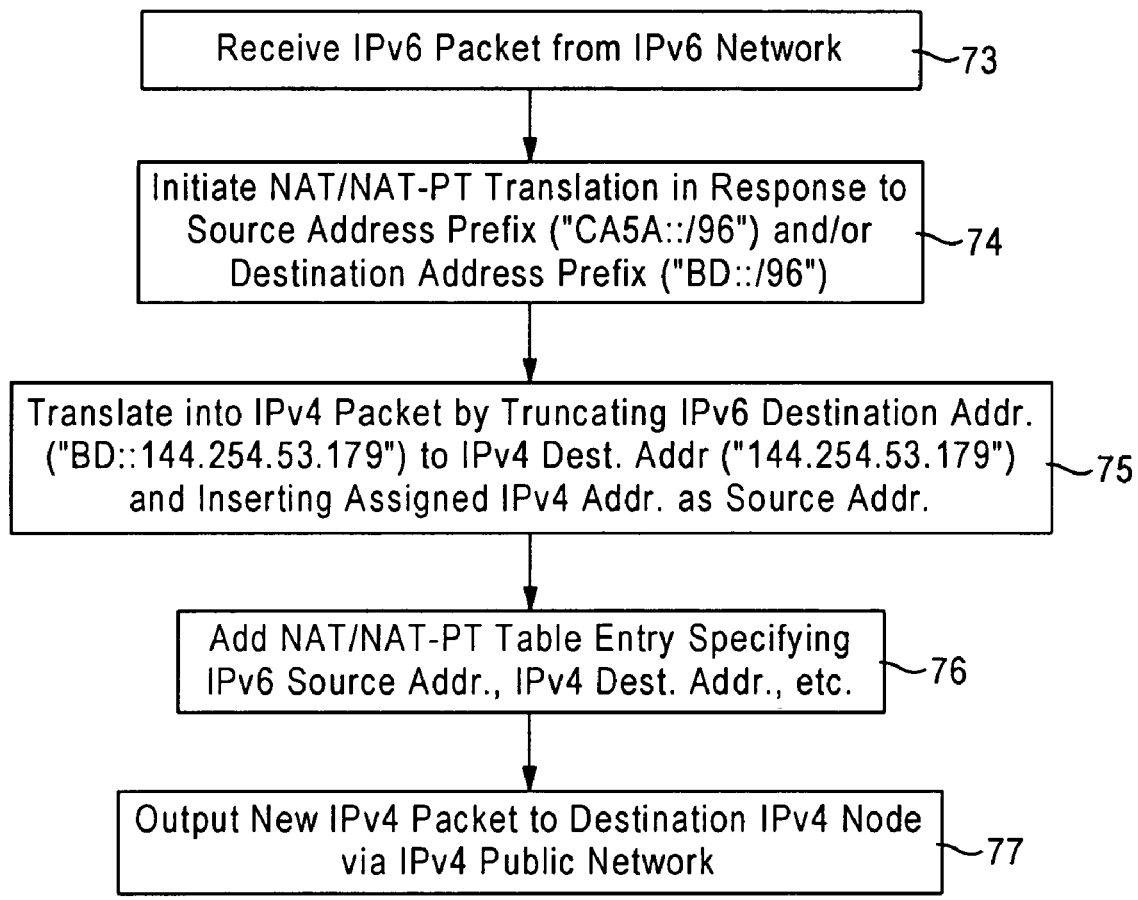

FIG. 3B illustrates translation of the IPv6 packet 104 by the remote gateway 32 into a new IPv4 packet 110 for transfer to the destination node 22 via the public IPv4 network 16. The IPv6 interface 44 of the remote gateway 32 receives in step 73 the IPv6 packet 104 from the IPv6 access network 14. The translation resource 50 initiates in step 74 the NAT/NAT-PT translation, for example in response to identifying the source address prefix 34 identifies a local gateway 30 having performed IPv4 to IPv6 translation, and/or based on identifying the destination address prefix 38 to be used for IPv6 to IPv4 translation services.

The translation resource 50 translates in step 75 the IPv6 packet 104 into an IPv4 packet 110 by truncating from the IPv6 destination address ("BD::144.254.53.179")108 the address prefix ("BD::/96") 38 assigned to the remote gateway 32, resulting in the IPv4 destination address ("144.254.53.179") 24. The translation resource 52 also inserts its assigned IPv4 address ("66.168.123.154") 112 into the source address field, resulting in the IPv4 packet 110 of FIG. 4A. If protocol translation is needed (e.g., TCP/UDP private-to-public translation), the translator 50 performance NAT-PT translation. Also, the ALG resource 52 parses the payload 102 to determine if address translation is needed within the payload 110, and performs address translation as necessary.

The translation resource 50 also stores the translation state information for the local gateway 30 in step 76 by adding a table entry 56 that specifies at least the IPv6 source address 106 (including the local gateway prefix 34 and the IPv4 private address 20), and the IPv4 destination address 24. As described above, additional IPv4/IPv6/TCP/UDP information may be stored, depending on implementation. The IPv4 interface 40 of the remote gateway 32 outputs in step 77 the new IPv4 packet 110 for delivery to the destination IPv4 node ("D") 22 via the public IPv4 network 16.

Figure 3C:
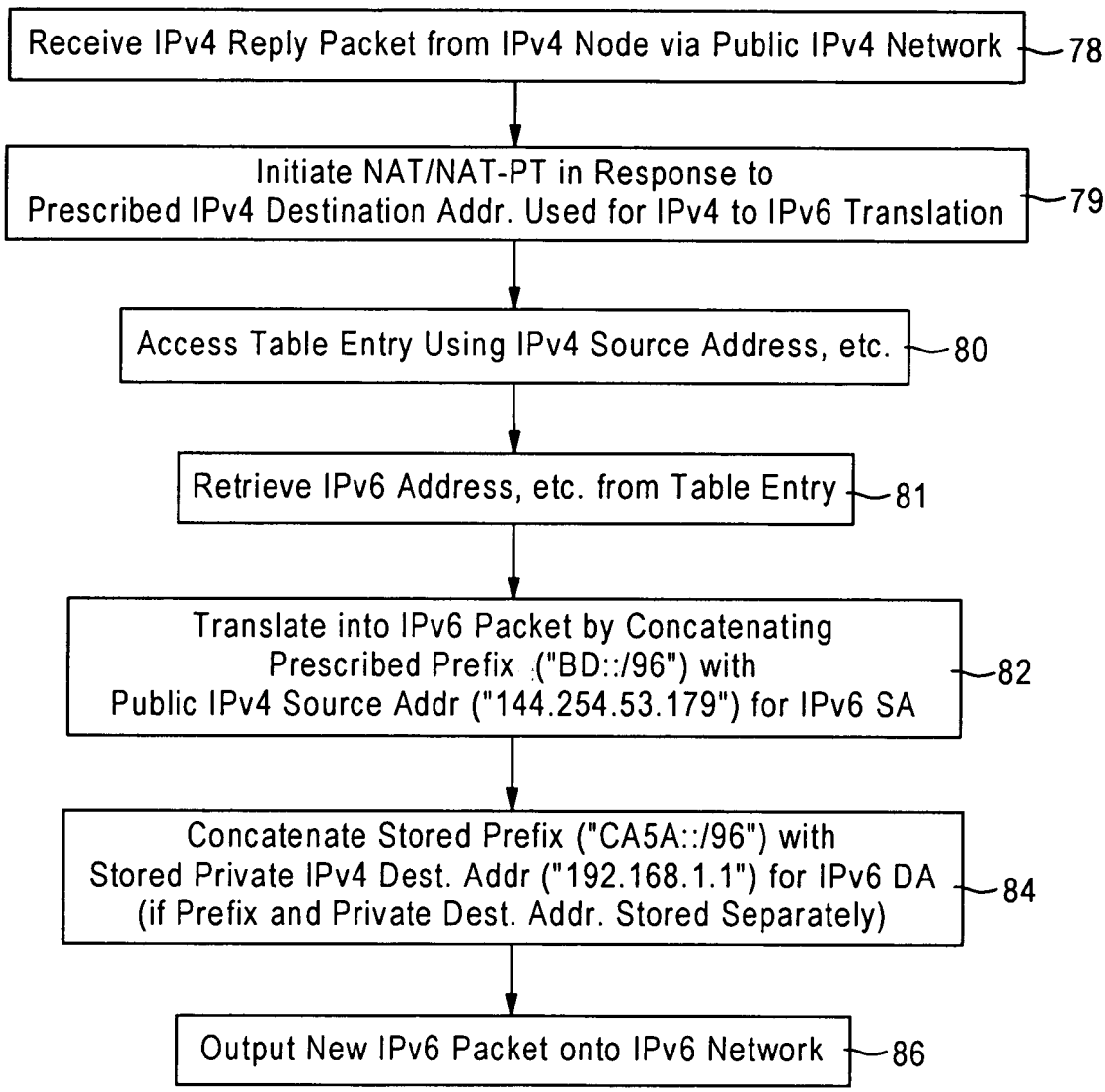

FIG. 3C illustrates translation by the remote gateway 32 of the IPv4 packet 120, received from the public IPv4 node 22 via the public IPv4 network 16, into a new IPv6 packet 122 for transfer to the local gateway 30 via the IPv6 network 14. The IPv4 interface 40 of the remote gateway 32 receives in step 78 an IPv4 reply packet 120 from the IPv4 node 22 via the public network 16.

The translator 50, in response to detecting in step 79 the prescribed IPv4 destination address 112 assigned to the remote gateway 32, initiates NAT/NAT-PT translation by accessing in step 80 the table entry 56 using the IPv4 source address 24 as a key, as well as any other relevant address fields depending on implementation. The translator 50 retrieves in step 81 the stored IPv6 address 106 including the address prefix 34 of the local gateway 30, and the private IP address 20 of the source node 18. The translator 50 also retrieves any other necessary address information from the accessed table entry 56.

The translator 50 translates the IPv4 packet 120 into an IPv6 packet 122 in step 82 by concatenating its prescribed prefix ("BD::/96") 38 with the public IPv4 source address ("144.254.53.179") 24 to form the IPv6 source address ("BD::144.254.53.179") 108. If the prefix 34 and the private IPv4 address 20 are stored separately in the table entry 56, the translator 50 concatenates in step 84 the prefix 34 and the private IPv4 address 20 to form the IPv6 destination address 106 for the IPv6 packet 122.

Hence, that the remote gateway 32 constructs the IPv6 addresses in the packet 122 in a way that enables the home gateway 30 to extract the private IPv4 address 20 merely by truncating the corresponding address prefix 34 of the home gateway 30 in the destination address field of the IPv6 packet 122. If necessary, the translator 50 performs NAT-PT translation, and the ALG resource 52 translates any addresses in the payload 102'.

The IPv6 interface 44 of the remote gateway 32 outputs in step 86 the new IPv6 packet 122 onto the IPv6 access network 14 for delivery to the local gateway 30.

Figure 3D:
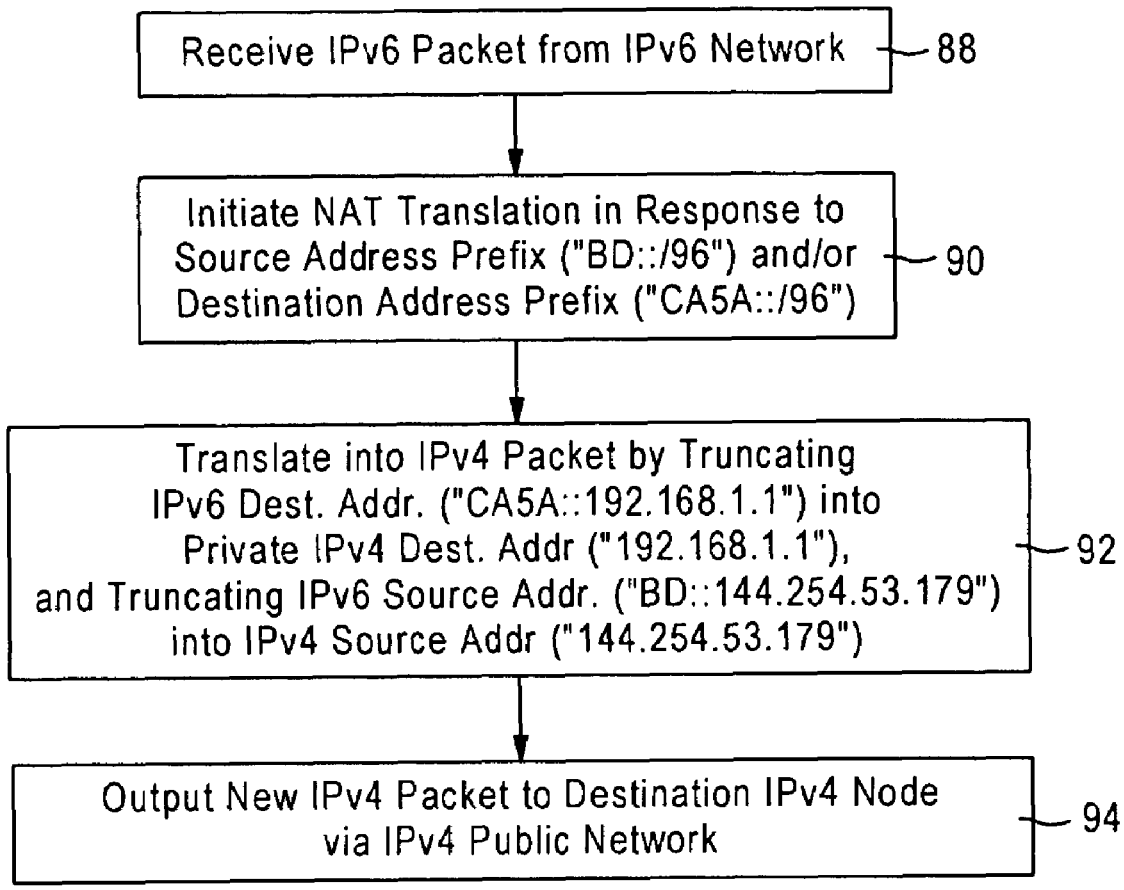

FIG. 3D is a diagram illustrating translation of the IPv6 packet 122 into the IPv4 packet 124 for delivery to the private IPv4 node 18. In response to the IPv6 interface 44 of the local gateway 30 receiving in step 88 the IPv6 packet 122 from the IPv6 network 14, the translation resource 42 initiates translation in step 90 in response to the source address prefix 38 indicating the packets from the remote gateway 32, and/or in response to determining the destination address prefix 34 which is used for translation between the IPv6 access network 14 and the private IPv4 network 12.

The translation resource 42 translates in step 92 the IPv6 packet 122 into the IPv4 packet 124 by truncating the IPv6 destination address ("CA5A::192.168.1.1") 106 into the private IPv4 destination address ("192.168.1.1") 20; and truncating the IPv6 source address ("BD::144.254.53.179")108 into the IPv4 source address ("144.254.53.179") 24. The IPv4 interface 40 outputs in step 94 the newly-created IPv4 packet 124 for delivery to the private IPv4 node 18. Note that the local gateway 30 does not need to perform any ALG-based translations, since ALG translations are performed in the remote gateway 32.

According to the disclosed embodiment, IPv4 packets can be transmitted across an IPv6 network, without the necessity of generating an IPv6 tunnel. Hence, the disclosed embodiment is particularly beneficial for streaming technologies such as voice over IP and video streaming, where packet size tends to be relatively small.

In addition, the disclosed embodiment enables an IPv4 private network to be combined with an IPv6 mobile network, where mobility can be managed by mobile IPv6 protocols, while providing access to public IPv4 network such as the Internet. In addition, the same IPv4 private network can be configured in all private networks, including mobile networks, simplifying large-scale provisioning.

Although the disclosed embodiment has been described with respect to the private network 12 having IPv4 nodes with private IPv4 addresses, the private network 12 also could have IPv6 nodes that communicate with an IPv4 node 18, so long as the local gateway has a NAT-PT functionality implemented in the local gateway 30.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a gateway coupled to an IPv6 network, the method including:
   receiving from an IPv4 node an IPv4 packet having a source address field specifying an IPv4 address of the IPv4 node, and a destination address field specifying a globally-unique IPv4 address of an IPv4 node reachable via a remote IPv4 network, and an IPv4 payload;
   translating the IPv4 packet into a new IPv6 packet that includes an IPv6 source address field, an IPv6 destination field, and the IPv4 payload, the IPv6 source address field specifying a first prescribed address prefix assigned to the gateway and the IPv4 address of the IPv4 node, the IPv6 destination address field specifying a second address prefix of a remote gateway and the globally-unique IPv4 address, the remote gateway reachable via an IPv6 network and providing connectivity to a remote IPv4 network; and
   outputting the new IPv6 packet to the remote gateway via the IPv6 network.

2. The method of claim 1, further comprising identifying the remote gateway by:
   sending a query to a prescribed server resource within the IPv6 network; and
   receiving a query response that includes the second address prefix;
   wherein the translating includes obtaining the second address prefix from the query response for the remote gateway.

3. The method of claim 1, wherein the IPv4 address of the IPv4 node is a private address.

4. The method of claim 3, further comprising:
   receiving a second IPv6 packet having the corresponding source address field specifying a third IPv6 address and the corresponding destination address field specifying a fourth IPv6 address, the third IPv6 address specifying the second address prefix of the remote gateway and the globally-unique IPv4 address, the fourth IPv6 address specifying the first prescribed address prefix assigned to the gateway and the IPv4 address of the IPv4 node;

translating the second IPv6 packet into a second IPv4 packet having the corresponding source address field specifying the globally-unique IPv4 address retrieved from the second IPv6 packet, and the corresponding destination address field specifying the IPv4 address of the IPv4 node; and outputting the second IPv4 packet to the IPv4 node.

5. The method of claim 4, wherein the translating the second IPv6 packet into the second IPv4 packet is executed in response to detecting one of the second address, prefix in the corresponding source address field of the second IPv6 packet and the first prescribed address prefix in the corresponding destination address field of the second IPv6 packet.

6. A method in a gateway coupled to an IPv6 network and an IPv4 network, the method comprising:

receiving from an IPv6 node via the IPv6 network air IPv6 packet having a source address field specifying a first IPv6 address, a destination address field specifying a second IPv6 address, and a payload, the first IPv6 address specifying a first address prefix assigned to the IPv6 node, the first IPv6 address further specifying a first IPv4 address, the second IPv6 address specifying a second address prefix assigned to the gateway and a globally-unique IPv4 address;

translating the IPv6 packet into a new IPv4 packet that includes an IPv4 source address field, an IPv4 destination address field, and the payload, including inserting within the IPv4 source address field a prescribed IPv4 address assigned to the gateway, and inserting within the IPv4 destination address field the globally-unique IPv4 address based on retrieval thereof from the second IPv6 address;

storing the first IPv6 address, and the globally-unique IPv4 address, in a Network Address Translation (NAT) table entry; and outputting the new IPv4 packet for delivery via the IPv4 network according to the globally-unique IPv4 address.

7. The method of claim 6, wherein the translating includes identifying the globally-unique IPv4 address based on truncating the second address prefix from the second IPv6 address.

8. The method of claim 7, further including:

receiving a second IPv4 packet from the IPv4 network having the corresponding source address field specifying the globally-unique IPv4 address and the corresponding destination address field specifying the prescribed IPv4 address assigned to the gateway;

translating the second IPv4 packet into a new IPv6 packet having the corresponding source address field specifying the second address prefix assigned to the gateway and the globally-unique IPv4 address retrieved from the second IPv4 packet, and the corresponding destination address field specifying the first address prefix, the translating including retrieving the first address prefix from the NAT table entry for the destination address field based on the source address field of the second IPv4 packet; and outputting the new IPv6 packet to the IPv6 node via the IPv6 network.

9. The method of claim 8, wherein:

the storing includes storing in the NAT table entry the first IPv4 address; and the translating of the second IPv4 packet into the new IPv6 packet includes:

(1) concatenating the second address prefix with the globally-unique IPv4 address to form a synthesized IPv6 address for the source address field of the new IPv6 packet, and (2) concatenating the first address prefix with the first IPv4 address to form a second synthesized IPv6 address for the destination address field of the new IPv6 packet.

10. The method of claim 9, wherein the first IPv4 address is a private address.

11. The method of claim 6, wherein the first IPv4 address is a private address.

12. A method in an IPv6 network including first and second gateways, the method comprising:

in the first gateway, coupled to a private IPv4 network and the IPv6 network:

(1) receiving from an IPv4 node in the private IPv4 network an IPv4 packet having a source address field specifying an IPv4 address of the IPv4 node, and a destination address field specifying a globally-unique IPv4 address of an IPv4 node reachable via a public IPv4 network, and an IPv4 payload, (2) translating the IPv4 packet into a new IPv6 packet that includes an IPv6 source address field, an IPv6 destination field, and the IPv4 payload, the IPv6 source address field specifying a first prescribed address prefix assigned to the first gateway and the IPv4 address of the IPv4 node, the IPv6 destination address field specifying a second address prefix assigned to the second gateway and the globally-unique IPv4 address, and (3) outputting the new IPv6 packet to the second gateway via the IPv6 network; and in the second gateway, coupled to the IPv6 network and the public IPv4 network:

(1) receiving from the first gateway via the IPv6 network the new IPv6 packet, (2) translating the new IPv6 packet into a new IPv4 packet based on inserting within the corresponding IPv4 source address field a prescribed IPv4 address assigned to the second gateway, and inserting within the corresponding IPv4 destination address field the globally-unique IPv4 address based on retrieval thereof from the second IPv6 address, (3) storing the first IPv6 address, and the globally-unique IPv4 address, in a Network Address Translation (NAT) table entry, and (4) outputting the new IPv4 packet, having the IPv4 payload, for delivery via the public IPv4 network according to the globally-unique IPv4 address.

13. The method of claim 12, further comprising, in the first gateway:

sending a query to a prescribed server resource within the IPv6 network; and receiving a query response that includes the second address prefix;

wherein the translating includes obtaining the second address prefix from the query response for the second gateway.

14. The method of claim 12, wherein the IPv4 address of the IPv4 node is a private address.

15. The method of claim 12, further including, in the second gateway:

receiving a second IPv4 packet from the public IPv4 network having the corresponding source address field specifying the globally-unique IPv4 address and the corresponding destination address field specifying the prescribed IPv4 address assigned to the gateway;

translating the second IPv4 packet into a second IPv6 packet having the corresponding source address field specifying a third IPv6 address having the second address prefix assigned to the second gateway and the globally-unique IPv4 address retrieved from the second IPv4 packet, and the corresponding destination address field specifying a fourth IPv6 address having the first address prefix, the translating including retrieving the first address prefix from the NAT table entry for the destination address field based on the source address field of the second IPv4 packet; and outputting the second IPv6 packet to the first gateway via the IPv6 network.

16. The method of claim 15, wherein:

the storing includes storing in the NAT table entry the first IPv4 address; and the translating of the second IPv4 packet into the second IPv6 packet includes:

(1) concatenating the second address prefix with the globally-unique IPv4 address to form a synthesized IPv6 address for the source address field of the second IPv6 packet, and (2) concatenating the first address prefix with the first IPv4 address to form a second synthesized IPv6 address for the destination address field of the second IPv6 packet.

17. The method of claim 16, wherein the IPv4 address of the IPv4 node is a private address.

18. The method of claim 15, further comprising, in the first gateway:

receiving the second IPv6 packet having the corresponding source address field specifying the third IPv6 address and the corresponding destination address field specifying the fourth IPv6 address, translating the second IPv6 packet into a second IPv4 packet having the corresponding source address field specifying the globally-unique IPv4 address retrieved from the corresponding source address field of the second IPv6 packet, and the corresponding destination address field specifying the IPv4 address of the IPv4 node; and outputting the second IPv4 packet to the IPv4 node.

19. A gateway coupled to an IPv6 network, the gateway comprising:

an IPv4 interface configured for receiving from an IPv4 node an IPv4 packet having a source address field specifying an IPv4 address of the IPv4 node, and a destination address field specifying a globally-unique IPv4 address of an IPv4 node reachable via a remote IPv4 network, and an IPv4 payload;

a translator configured for translating the IPv4 packet into a new IPv6 packet that includes an IPv6 source address field, an IPv6 destination field, and the IPv4 payload, the IPv6 source address field specifying a first prescribed address prefix assigned to the gateway and the IPv4 address of the IPv4 node, the IPv6 destination address field specifying a second address prefix of a remote gateway and the globally-unique IPv4 address, the remote gateway reachable via an IPv6 network and providing connectivity to a remote IPv4 network; and an IPv6 interface configured for outputting the new IPv6 packet to the remote gateway via the IPv6 network.

20. The gateway of claim 19, further comprising a discovery resource configured for identifying the remote gateway by:

sending a query to a prescribed server resource within the IPv6 network; and receiving a query response that includes the second address prefix;

the translator configured for obtaining the second address prefix from the query response for the remote gateway.

21. The gateway of claim 19, wherein the IPv4 address of the IPv4 node is a private address.

22. The gateway of claim 21, wherein:

the IPv6 interface is configured for receiving a second IPv6 packet having the corresponding source address field specifying a third IPv6 address and the corresponding destination address field specifying a fourth IPv6 address, the third IPv6 address specifying the second address prefix of the remote gateway and the globally-unique IPv4 address, the fourth IPv6 address specifying the first prescribed address prefix assigned to the gateway and the IPv4 address of the IPv4 node;

the translator is configured for translating the second IPv6 packet into a second IPv4 packet having the corresponding source address field specifying the globally-unique IPv4 address retrieved from the second IPv6 packet, and the corresponding destination address field specifying the IPv4 address of the IPv4 node; and the IPv4 interface is configured for outputting the second IPv4 packet to the IPv4 node.

23. The gateway of claim 22, wherein the translator is configured for translating the second IPv6 packet into the second IPv4 packet in response to detecting one of the second address prefix in the corresponding source address field of the second IPv6 packet and the first prescribed address prefix in the corresponding destination address field of the second IPv6 packet.

24. A gateway coupled to an IPv6 network and an IPv4 network, the gateway comprising:

an IPv6 interface configured for receiving from an IPv6 node via the IPv6 network an IPv6 packet having a source address field specifying a first IPv6 address, a destination address field specifying a second IPv6 address, and a payload, the first IPv6 address specifying a first address prefix assigned to the IPv6 node, the first IPv6 address further specifying a first IPv4 address, the second IPv6 address specifying a second address prefix assigned to the gateway and a globally-unique IPv4 address;

a Network Address Translation (NAT) table configured for storing NAT table entries;

a translator configured for translating the IPv6 packet into a new IPv4 packet that includes an IPv4 source address field, an IPv4 destination address field, and the payload, including inserting within the IPv4 source address field a prescribed IPv4 address assigned to the gateway, and inserting within the IPv4 destination address field the globally-unique IPv4 address based on retrieval thereof from the second IPv6 address, the translator configured for storing the first IPv6 address, and the globally-unique IPv4 address, in the NAT table as a NAT table entry; and an IPv4 interface configured for outputting the new IPv4 packet for delivery via the IPv4 network according to the globally-unique IPv4 address.

25. The gateway of claim 24, wherein the translator is configured for identifying the globally-unique IPv4 address based on truncating the second address prefix from the second IPv6 address.

26. The gateway of claim 25, wherein:

the IPv4 interface is configured for receiving a second IPv4 packet from the IPv4 network having the corresponding source address field specifying the globally-unique IPv4 address and the corresponding destination address field specifying the prescribed IPv4 address assigned to the gateway;

the translator is configured for translating the second IPv4 packet into a new IPv6 packet having the corresponding source address field specifying the second address prefix assigned to the gateway and the globally-unique IPv4 address retrieved from the second IPv4 packet, and the corresponding destination address field specifying the first address prefix, the translator configured for retrieving the first address prefix from the NAT table entry for the destination address field based on the source address field of the second IPv4 packet; and the IPv6 interface is configured for outputting the new IPv6 packet to the IPv6 node via the IPv6 network.

27. The gateway of claim 26, wherein:

the translator is configured for storing in the NAT table entry the first IPv4 address; and the translator is configured for translating the second IPv4 packet into the new IPv6 packet based on:

(1) concatenating the second address prefix with the globally-unique IPv4 address to form a synthesized IPv6 address for the source address field of the new IPv6 packet, and (2) concatenating the first address prefix with the first IPv4 address to form a second synthesized IPv6 address for the destination address field of the new IPv6 packet.

28. The gateway of claim 27, wherein the first IPv4 address is a private address.

29. The gateway of claim 24, wherein the first IPv4 address is a private address.

30. An IPv6 network comprising:

a first gateway coupled to a private IPv4 network and an IPv6 network; and a second gateway coupled to the IPv6 network and a public IPv4 network;

wherein the first gateway comprises:

(1) a first IPv4 interface configured for receiving from an IPv4 node in the private IPv4 network an IPv4 packet having a source address field specifying an IPv4 address of the IPv4 node, and a destination address field specifying a globally-unique IPv4 address of an IPv4 node reachable via a public IPv4 network, and an IPv4 payload, (2) a first translator configured for translating the IPv4 packet into a new IPv6 packet that includes an IPv6 source address field, an IPv6 destination field, and the IPv4 payload, the IPv6 source address field specifying a first prescribed address prefix assigned to the first gateway and the IPv4 address of the IPv4 node, the IPv6 destination address field specifying a second address prefix assigned to the second gateway and the globally-unique IPv4 address, and (3) a first IPv6 interface configured for outputting the new IPv6 packet to the second gateway via the IPv6 network;

wherein the second gateway comprises:

(1) a second IPv6 interface configured for receiving from the first gateway via the IPv6 network the new IPv6 packet, (2) a second translator configured for translating the new IPv6 packet into a new IPv4 packet based on inserting within the corresponding IPv4 source address field a prescribed IPv4 address assigned to the second gateway, and inserting within the corresponding IPv4 destination address field the globally-unique IPv4 address based on retrieval thereof from the second IPv6 address, (3) a Network Address Translation (NAT) table, the second translator configured for storing the first IPv6 address, and the globally-unique IPv4 address, in a NAT table entry, and (4) an second IPv4 interface configured for outputting the new IPv4 packet, having the IPv4 payload, for delivery via the public IPv4 network according to the globally-unique IPv4 address.

31. The network of claim 30, wherein the first gateway further comprises:

a discovery resource configured for sending a query to a prescribed server resource within the IPv6 network, and receiving a query response that includes the second address prefix;

wherein the translator is configured for obtaining the second address prefix from the query response for the second gateway.

32. The network of claim 30, wherein the IPv4 address of the IPv4 node is a private address.

33. The network of claim 30, wherein, in the second gateway:

the second IPv4 interface is configured for receiving a second IPv4 packet from the public IPv4 network having the corresponding source address field specifying the globally-unique IPv4 address and the corresponding destination address field specifying the prescribed IPv4 address assigned to the gateway;

the second translator is configured for translating the second IPv4 packet into a second IPv6 packet having the corresponding source address field specifying a third IPv6 address having the second address prefix assigned to the second gateway and the globally-unique IPv4 address retrieved from the second IPv4 packet, and the corresponding destination address field specifying a fourth IPv6 address having the first address prefix, the second translator configured for retrieving the first address prefix from the NAT table entry for the destination address field based on the source address field of the second IPv4 packet; and the second IPv6 interface is configured for outputting the second IPv6 packet to the first gateway via the IPv6 network.

34. The network of claim 33, wherein:

the second translator is configured for storing in the NAT table entry the first IPv4 address; and the second translator is configured for translating the second IPv4 packet into the second IPv6 packet based on:

(1) concatenating the second address prefix with the globally-unique IPv4 address to form a synthesized IPv6 address for the source address field of the second IPv6 packet, and (2) concatenating the first address prefix with the first IPv4 address to form a second synthesized IPv6 address for the destination address field of the second IPv6 packet.

35. The network of claim 34, wherein the IPv4 address of the IPv4 node is a private address.

36. The network of claim 33, wherein, in the first gateway:
the first IPv6 interface is configured for receiving the second IPv6 packet having the corresponding source address field specifying the third IPv6 address and the corresponding destination address field specifying the fourth IPv6 address,
the first translator is configured for translating the second IPv6 packet into a second IPv4 packet having the corresponding source address field specifying the globally-unique IPv4 address retrieved from the corresponding source address field of the second IPv6 packet, and the corresponding destination address field specifying the IPv4 address of the IPv4 node; and
the first IPv4 interface is configured for outputting the second IPv4 packet to the IPv4 node.

37. A gateway coupled to an IPv6 network, the gateway comprising:
means for receiving from an IPv4 node an IPv4 packet having a source address field specifying an IPv4 address of the IPv4 node, and a destination address field specifying a globally-unique IPv4 address of an IPv4 node reachable via a remote IPv4 network, and an IPv4 payload;
means for translating the IPv4 packet into a new IPv6 packet that includes an IPv6 source address field, an IPv6 destination field, and the IPv4 payload, the IPv6 source address field specifying a first prescribed address prefix assigned to the gateway and the IPv4 address of the IPv4 node, the IPv6 destination address field specifying a second address prefix of a remote gateway and the globally-unique IPv4 address, the remote gateway reachable via an IPv6 network and providing connectivity to a remote IPv4 network; and
means for outputting the new IPv6 packet to the remote gateway via the IPv6 network.

38. The gateway of claim 37, further comprising means for identifying the remote gateway by:
sending a query to a prescribed server resource within the IPv6 network; and
receiving a query response that includes the second address prefix;
wherein the means for translating is configured for obtaining the second address prefix from the query response for the remote gateway.

39. The gateway of claim 37, wherein the IPv4 address of the IPv4 node is a private address.

40. The gateway of claim 39, wherein:
the means for outputting is configured for receiving a second IPv6 packet having the corresponding source address field specifying a third IPv6 address and the corresponding destination address field specifying a fourth IPv6 address, the third IPv6 address specifying the second address prefix of the remote gateway and the globally-unique IPv4 address, the fourth IPv6 address specifying the first prescribed address prefix assigned to the gateway and the IPv4 address of the IPv4 node;
the means for translating is configured for translating the second IPv6 packet into a second IPv4 packet having the corresponding source address field specifying the globally-unique IPv4 address retrieved from the second IPv6 packet, and the corresponding destination address field specifying the IPv4 address of the IPv4 node; and
the means for receiving is configured for outputting the second IPv4 packet to the IPv4 node.

41. The gateway of claim 40, wherein the means for translating is configured for translating the second IPv6 packet into the second IPv4 packet in response to detecting one of the second address prefix in the corresponding source address field of the second IPv6 packet and the first prescribed address prefix in the corresponding destination address field of the second IPv6 packet.

42. A gateway coupled to an IPv6 network and an IPv4 network, the gateway comprising:
means for receiving from an IPv6 node via the IPv6 network an IPv6 packet having a source address field specifying a first IPv6 address, a destination address field specifying a second IPv6 address, and a payload, the first IPv6 address specifying a first address prefix assigned to the IPv6 node, the first IPv6 address further specifying a first IPv4 address, the second IPv6 address specifying a second address prefix assigned to the gateway and a globally-unique IPv4 address;
means for translating the IPv6 packet into a new IPv4 packet that includes an IPv4 source address field, an IPv4 destination address field, and the payload, including inserting within the IPv4 source address field a prescribed IPv4 address assigned to the gateway, and inserting within the IPv4 destination address field the globally-unique IPv4 address based on retrieval thereof from the second IPv6 address;
a Network Address Translation (NAT) table, the means for translating configured for storing the first IPv6 address, and the globally-unique IPv4 address, in a NAT table entry; and
means for outputting the new IPv4 packet for delivery via the IPv4 network according to the globally-unique IPv4 address.

43. The gateway of claim 42, wherein the means for translating is configured for identifying the globally-unique IPv4 address based on truncating the second address prefix from the second IPv6 address.

44. The gateway of claim 43, wherein:
the means for outputting is configured for receiving a second IPv4 packet from the IPv4 network having the corresponding source address field specifying the globally-unique IPv4 address and the corresponding destination address field specifying the prescribed IPv4 address assigned to the gateway;
the means for translating is configured for translating the second IPv4 packet into a new IPv6 packet having the corresponding source address field specifying the second address prefix assigned to the gateway and the globally-unique IPv4 address retrieved from the second IPv4 packet, and the corresponding destination address field specifying the first address prefix, the means for translating configured for retrieving the first address prefix from the NAT table entry for the destination address field based on the source address field of the second IPv4 packet; and
the means for receiving is configured for outputting the new IPv6 packet to the IPv6 node via the IPv6 network.

45. The gateway of claim 44, wherein:
the means for translating is configured for storing in the NAT table entry the first IPv4 address; and
the means for translating is configured for translating the second IPv4 packet into the new IPv6 packet based on:
(1) concatenating the second address prefix with the globally-unique IPv4 address to form a synthesized IPv6 address for the source address field of the new IPv6 packet, and (2) concatenating the first address prefix with the first IPv4 address to form a second synthesized IPv6 address for the destination address field of the new IPv6 packet.

46. The gateway of claim 45, wherein the first IPv4 address is a private address.

47. The gateway of claim 42, wherein the first IPv4 address is a private address.

48. An IPv6 network comprising:

a first gateway coupled to a private IPv4 network and an IPv6 network; and a second gateway coupled to the IPv6 network and a public IPv4 network;

wherein the first gateway comprises::
  (1) first means for receiving from an IPv4 node in the private IPv4 network an IPv4 packet having a source address field specifying an IPv4 address of the IPv4 node, and a destination address field specifying a globally-unique IPv4 address of an IPv4 node reachable via a public IPv4 network, and an IPv4 payload,
  (2) second means for translating the IPv4 packet into a new IPv6 packet that includes an IPv6 source address field, an IPv6 destination field, and the IPv4 payload, the IPv6 source address field specifying a first prescribed address prefix assigned to the first gateway and the IPv4 address of the IPv4 node, the IPv6 destination address field specifying a second address prefix assigned to the second gateway and the globally-unique IPv4 address, and
  (3) third means for outputting the new IPv6 packet to the second gateway via the IPv6 network;

wherein the second gateway comprises:
  (1) fourth means for receiving from the first gateway via the IPv6 network the new IPv6 packet,
  (2) fifth means for translating the new IPv6 packet into a new IPv4 packet based on inserting within the corresponding IPv4 source address field a prescribed IPv4 address assigned to the second gateway, and inserting within the corresponding IPv4 destination address field the globally-unique IPv4 address based on retrieval thereof from the second IPv6 address,
  (3) a Network Address Translation (NAT) table, the fifth means configured for storing the first IPv6 address, and the globally-unique IPv4 address, in a NAT table entry, and
  (4) sixth means for outputting the new IPv4 packet, having the IPv4 payload, for delivery via the public IPv4 network according to the globally-unique IPv4 address.

49. The network of claim 48, further comprising, in the first gateway:

means for sending a query to a prescribed server resource within the IPv6 network, the means for sending receiving a query response that includes the second address prefix;

wherein the second means is configured for obtaining the second address prefix from the query response for the second gateway.

50. The network of claim 48, wherein the IPv4 address of the IPv4 node is a private address.

51. The network of claim 48, wherein, in the second gateway:

the sixth means is configured for receiving a second IPv4 packet from the public IPv4 network having the corresponding source address field specifying the globally-unique IPv4 address and the corresponding destination address field specifying the prescribed IPv4 address assigned to the gateway;

the fifth means is configured for translating the second IPv4 packet into a second IPv6 packet having the corresponding source address field specifying a third IPv6 address having the second address prefix assigned to the second gateway and the globally-unique IPv4 address retrieved from the second IPv4 packet, and the corresponding destination address field specifying a fourth IPv6 address having the first address prefix, the fifth means configured for retrieving the first address prefix from the NAT table entry for the destination address field based on the source address field of the second IPv4 packet; and the fourth means configured for outputting the second IPv6 packet to the first gateway via the IPv6 network.

52. The network of claim 51, wherein:

the fifth means is configured for storing in the NAT table entry the first IPv4 address; and the fifth means is configured for translating of the second IPv4 packet into the second IPv6 packet based on:
  (1) concatenating the second address prefix with the globally-unique IPv4 address to form a synthesized IPv6 address for the source address field of the second IPv6 packet, and
  (2) concatenating the first address prefix with the first IPv4 address to form a second synthesized IPv6 address for the destination address field of the second IPv6 packet.

53. The network of claim 52, wherein the IPv4 address of the IPv4 node is a private address.

54. The network of claim 51, wherein, in the first gateway:

the third means is configured for receiving the second IPv6 packet having the corresponding source address field specifying the third IPv6 address and the corresponding destination address field specifying the fourth IPv6 address, the second means is configured for translating the second IPv6 packet into a second IPv4 packet having the corresponding source address field specifying the globally-unique IPv4 address retrieved from the corresponding source address field of the second IPv6 packet, and the corresponding destination address field specifying the IPv4 address of the IPv4 node; and the first means is configured for outputting the second IPv4 packet to the IPv4 node.

55. A computer readable medium having stored thereon sequences of computer executable instructions for outputting an IPv6 packet by a gateway coupled to an IPv6 network, the sequences of instructions including instructions for:

receiving from an IPv4 node an IPv4 packet having a source address field specifying an IPv4 address of the IPv4 node, and a destination address field specifying a globally-unique IPv4 address of an IPv4 node reachable via a remote IPv4 network, and an IPv4 payload;

translating the IPv4 packet into a new IPv6 packet that includes an IPv6 source address field, an IPv6 destination field, and the IPv4 payload, the IPv6 source address field specifying a first prescribed address prefix assigned to the gateway and the IPv4 address of the IPv4 node, the IPv6 destination address field specifying a second address prefix of a remote gateway and the globally-unique IPv4 address, the remote gateway reachable via an IPv6 network and providing connectivity to a remote IPv4 network; and outputting the new IPv6 packet to the remote gateway via the IPv6 network.

56. The medium of claim 55, further comprising instructions for identifying the remote gateway by:
sending a query to a prescribed server resource within the IPv6 network; and
receiving a query response that includes the second address prefix;
wherein the translating includes obtaining the second address prefix from the query response for the remote gateway.

57. The medium of claim 55, wherein the IPv4 address of the IPv4 node is a private address.

58. The medium of claim 55, further comprising instructions for:
receiving a second IPv6 packet having the corresponding source address field specifying a third IPv6 address and the corresponding destination address field specifying a fourth IPv6 address, the third IPv6 address specifying the second address prefix of the remote gateway and the globally-unique IPv4 address, the fourth IPv6 address specifying the first prescribed address prefix assigned to the gateway and the IPv4 address of the IPv4 node;
translating the second IPv6 packet into a second IPv4 packet having the corresponding source address field specifying the globally-unique IPv4 address retrieved from the second IPv6 packet, and the corresponding destination address field specifying the IPv4 address of the IPv4 node; and
outputting the second IPv4 packet to the IPv4 node.

59. The medium of claim 58, wherein the translating the second IPv6 packet into the second IPv4 packet is executed in response to detecting one of the second address prefix in the corresponding source address field of the second IPv6 packet and the first prescribed address prefix in the corresponding destination address field of the second IPv6 packet.

60. A computer readable medium having stored thereon sequences of computer executable instructions for outputting an IPv4 packet by a gateway coupled to an IPv6 network and an IPv4 network, the sequences of instructions including instructions for:
receiving from an IPv6 node via an IPv6 network an IPv6 packet having a source address field specifying a first IPv6 address, a destination address field specifying a second IPv6 address, and a payload, the first IPv6 address specifying a first address prefix assigned to the IPv6 node, the first IPv6 address further specifying a first IPv4 address, the second IPv6 address specifying a second address prefix assigned to the gateway and a globally-unique IPv4 address;
translating the IPv6 packet into a new IPv4 packet that includes an IPv4 source address field, an IPv4 destination address field, and the payload, including inserting within the IPv4 source address field a prescribed IPv4 address assigned to the gateway, and inserting within the IPv4 destination address field the globally-unique IPv4 address based on retrieval thereof from the second IPv6 address;
storing the first IPv6 address, and the globally-unique IPv4 address, in a Network Address Translation (NAT) table entry; and
outputting the new IPv4 packet onto an IPv4 network for delivery according to the globally-unique IPv4 address.

61. The medium of claim 60, wherein the translating includes identifying the globally-unique IPv4 address based on truncating the second address prefix from the second IPv6 address.

62. The medium of claim 61, further including instructions for:
receiving a second IPv4 packet from the IPv4 network having the corresponding source address field specifying the globally-unique IPv4 address and the corresponding destination address field specifying the prescribed IPv4 address assigned to the gateway;
translating the second IPv4 packet into a new IPv6 packet having the corresponding source address field specifying the second address prefix assigned to the gateway and the globally-unique IPv4 address retrieved from the second IPv4 packet, and the corresponding destination address field specifying the first address prefix, the translating including retrieving the first address prefix from the NAT table entry for the destination address field based on the source address field of the second IPv4 packet; and
outputting the new IPv6 packet to the IPv6 node via the IPv6 network.

63. The medium of claim 62, wherein:
the storing includes storing in the NAT table entry the first IPv4 address; and
the translating of the second IPv4 packet into the new IPv6 packet includes:
(1) concatenating the second address prefix with the globally-unique IPv4 address to form a synthesized IPv6 address for the source address field of the new IPv6 packet, and
(2) concatenating the first address prefix with the first IPv4 address to form a second synthesized IPv6 address for the destination address field of the new IPv6 packet.

64. The medium of claim 63, wherein the first IPv4 address is a private address.

65. The medium of claim 60, wherein the first IPv4 address is a private address.

* * * * *